Patented June 30, 1936

2,046,257

UNITED STATES PATENT OFFICE 2,046,257

CHEMICAL PROCESS

Robert Barnett Flint, Wilmington, Del., assignor to E. I. du Pont de Nemours & Company, Wilmington, Del., a corporation of Delaware No Drawing. Application January 5, 1934, Serial No. 705,399

9 Claims. (Cl. 260—1)

This invention relates to a process for the simultaneous catalytic hydrogenation of rubber and aromatic hydrocarbons.

The catalytic hydrogenation of rubber is generally known to the art. The existing practical processes all depend upon the use of saturated cyclic hydrocarbon solvents for rubber, to effect the hydrogenation.

An object of this invention is the simultaneous catalytic hydrogenation of rubber and an aromatic hydrocarbon. More specifically the invention has as an object the co-hydrogenation of rubber and an aromatic hydrocarbon such as toluene to produce hydrogenated rubber and hydroaromatic hydrocarbons such as methyl-cyclohexane with good yields. An additional object is the production of a solution of hydrogenated rubber in decahydronaphthalene by the simultaneous hydrogenation of rubber and naphthalene. Other objects will appear hereinafter.

It has been found that it is not necessary to use saturated cyclic hydrocarbon rubber solvents to accomplish hydrogenation. Instead, rubber in contact with an organic compound which upon hydrogenation is solvent for rubber and hydrogenated rubber may be hydrogenated smoothly to produce both hydrogenated rubber and an additional saturated organic compound. This is accomplished according to this invention preferably by a process which in a general way comprises the following steps: Rubber is cut into small pieces and together with a hydrocarbon such as toluene, naphthalene or anthrocene and a hydrogenating catalyst, is charged into an autoclave equipped for agitation. The autoclave is maintained at an elevated temperature and hydrogen pressure until the drop in pressure indicates the desired degree of hydrogenation. The catalyst is removed from the product by filtration, and the hydrogenated rubber is separated from the hydrogenated hydrocarbon by distillation.

In the following examples the preferred embodiments of the invention have been set forth, but they are presented for the purpose of illustration and not as limitations.

Example 1

A shaker tube built to withstand high pressure was charged with 223 grams of purified naphthalene, 50 grams of milled pale crepe rubber, cut into small pieces, and 15 grams of nickel-on-kieselguhr catalyst containing about 20–30% metallic nickel. The reaction tube was agitated at 180–200° C. and a hydrogen pressure of 1500 pounds per square inch for 30 minutes, during which time much of the naphthalene was hydrogenated. The reaction was highly exothermic and the heat evolved aided naturally in increasing the temperature and pressure to 275° C. and 2000 pounds pressure each respectively, which conditions were maintained for 2.5 hours and were favorable for the hydrogenation of rubber. After filtration to remove the catalyst the product was a smooth, viscous solution of hydrogenated rubber in decahydronaphthalene. The solvent was separated under vacuum and identified by its boiling point. The residual hydrogenated rubber was a normal product, with an iodine number indicating a 62% hydrogenation. There was no evidence of degradation and continued hydrogenation would have produced a completely hydrogenated product.

Example 2

50 grams of milled pale crepe rubber, cut into small pieces, 200 grams of toluene, and 15 grams of nickel-on-kieselguhr catalyst such as was described in Example 1, were charged into an autoclave equipped for agitation. At a temperature of 170° C., and a hydrogen pressure of 1000 pounds per square inch, the autoclave was agitated for 45 minutes. The pressure was then raised to 3000 pounds per square inch, the temperature increased to 270° C., and agitation continued for an additional period of 1.75 hours. The hydrogenation of the toluene was initiated at the lower temperature and the heat evolved aided in increasing the temperature to the latter value, which was favorable for the hydrogenation of the rubber. The product was an orange yellow, viscous material which on distillation under vacuum yielded hydrogenated rubber and methylcyclohexane in substantially theoretical quantities.

Proper agitation is an important factor in the success of the process, as it is important that the reactants and catalyst be in intimate contact. Agitation may be effected by internal stirring by mechanical or gaseous means as in an autoclave, or the entire reaction vessel may be agitated externally.

In the examples the use of toluene and naphthalene has been described, but many other organic compounds may be used. It is preferred to use polynuclear aromatic hydrocarbons, such as naphthalene, anthracene, and phenanthrene, but mononuclear compounds such as benzene, toluene, etc., may be used with varying degrees of success. Likewise partially hydrogenated aromatic compounds such as tetrahydronaphthalene may also be used, or mixtures of the named organic compounds may be used. A satisfactory menstruum may be defined as one which upon hydrogenation will act as a solvent for rubber and hydrogenated rubber.

Any convenient ratio of rubber to the liquid medium may be used, but to insure complete hydrogenation of the rubber and maintain a sufficiently low viscosity it is preferred to use a sufficient quantity of the second reactant to dissolve all the rubber upon hydrogenation.

In addition to rubber, other compounds of like nature may be hydrogenated by the processes of this invention. Such compounds include: raw rubber, gutta percha, balata, polymerized butadiene, polymerized chloro-2-butadiene-1,3, polymerized isoprene and synthetic rubbers generally, including that produced by heating rubber in the presence of benzene sulfonic acid. I do not wish to include rubber altered by chemical treatment to a form not readily hydrogenated, i. e., vulcanized rubber or rubber containing a substantial proportion of sulfur.

The conditions of temperature and pressure suitable for hydrogenation may be varied somewhat from the preferred values cited in the examples. It is desirable to initiate the reaction at relatively low pressure and temperature. Pressures between 500 and 2000 pounds per square inch and temperatures between 100° C. and 300° C. are suitable for the first part of the hydrogenation when reaction is very rapid, due to the hyrogenation of the hydrocarbon. After the speed of reaction has slowed somewhat it is desirable to raise the pressure and temperature to values between 2000 and 5000 pounds per square inch and 200° C. to 400° C. respectively, which conditions are more favorable for the hydrogenation of the rubber. The hydrogenation of the hydrocarbon develops so much heat that it is necessary to apply but little external heat to obtain the final temperature at which the hydrogenation of rubber occurs. The upper limit that may be used is limited only by the strength of the reaction vessel, but it has been found that excessive temperatures and pressures, although operative, tend to degrade the hydrogenated rubber to a degree which is undesirable for most purposes.

The relatively large proportion of catalyst in the above examples was used to make the reaction time as brief as possible. It will be apparent that other proportions may be used sucessfully by adjusting the time of reaction accordingly.

The nickel-on-kieselguhr catalyst mentioned in the examples is a preferred catalyst, but any hydrogenation catalyst may be used. For example, metallic iron or cobalt, preferably supported on an inert carrier, or metallic nickel supported on chromium oxide may be used. Unsupported catalysts, prepared by the reduction of metals, are generally less satisfactory because they are easily sintered during the reduction step, with resulting loss of activity. It is preferable, therefore, to use catalysts precipitated on any of the well known supporting materials such as pumice, silica gel, carbon, kieselguhr, fuller's earth, etc.

A notable advantage of this invention is found in the progressive hydrogenation of the hydrocarbon and rubber. The heat evolved by the hydrogenation of the hydrocarbon, which takes place at relatively low temperature, is available in the reaction mixture to increase the temperature to that necessary for the hydrogenation of the rubber. This advantage results in a smoother hydrogenation of the rubber and effects important economies in heat.

A further advantage of this invention is that it provides a rapid practical method for the preparation of hydrogenated rubber. When the rubber and the aromatic rubber solvent are simultaneously subjected to hydrogenating conditions the hydrogenation of the solvent starts off promptly thereby materially assisting in the more difficult hydrogenation of the rubber, with the highly advantageous result that both products are prepared in a single operation. The process described eliminates the slow and tedious operation of making a preformed solution of rubber in a solvent. As hydrogenation of the relatively cheap hydrocarbons used takes place simultaneously with the production of useful and more valuable solvents, the process is additionally economical.

Completely hydrogenated rubber as prepared by this process, is suitable for use as transformer liquid, an insulating material for submarine cables, a moisture-proofing agent for shot-gun shells when combined with waxes, a modifying agent for waxes used in automobile polishes, a constituent of varnish removers, an impregnating agent either alone or in combination with other materials for the preparation of waterproof cloth, etc. Partially hydrogenated rubber may be used as an adhesive. Rubber hydrogenated to the extent of about 25% may be vulcanized to a soft rubber which is useful for printers' rolls, liners for moving picture cameras and as cushions to absorb vibrations. Rubber, isomerized by treatment with sulfuric acid and heat, and then hydrogenated may be used in lacquers, paints, varnishes, as an adhesive, etc.

The above description and examples are illustrative only and are not to be construed as limiting the scope of the invention. Any modification or variation therefrom which conforms to the spirit of the invention is to be included within the scope of the claims.

I claim:

1. The process of claim 3 characterized in that the first stage is carried out under a temperature of 100°-300° C. and under a pressure of 500-2000 pounds per square inch, and the second stage is carried out under a temperature of 200°-400° C. and under a pressure of 2000-5000 pounds per square inch, the pressure and temperature prevailing in the second stage being higher than in the first stage.

2. The process which comprises hydrogenating a mixture of rubber and an unsaturated carbocyclic hydrocarbon selected from the group consisting of naphthalene, anthracene, phenanthrene, benzene and toluene at a temperature of 100°-300° C. and under a pressure of 500-2000 pounds per square inch in the presence of a nickel catalyst, then after the initial speed of reaction has slowed down, raising the temperature so as not to exceed 400° C. and raising the pressure so as not to exceed 5000 pounds per square inch, and discontinuing the reaction when the hydrogenation reaction has been sufficiently completed.

3. The process which comprises catalytically hydrogenating in two stages a material selected from the group consisting of rubber, raw rubber, gutta percha, balta, polymerized butadiene, polymerized chloro-2-butadiene-1,3, and polymerized isoprene, under a temperature of 100°-400° C. and under a pressure of 500-5000 pounds per square inch in the presence of an unsaturated organic compound selected from the group consisting of naphthalene, anthracene, phenanthrene, benzene, and toluene, the first stage being effected under relatively mild conditions of temperature and pressure and the second stage being carried out under a higher temperature and pressure.

4. The process of claim 2 characterized in that the hydrocarbon is toluene.

5. The process of claim 2 characterized in that the hydrocarbon is naphthalene.

6. The process in accordance with claim 3 characterized in that the reaction is carried out in the presence of a hydrogenating metal catalyst.

7. The process in accordance with claim 3 characterized in that the reaction is carried out in the presence of a hydrogenating metal catalyst supported on an inert carrier.

8. The process in accordance with claim 3 characterized in that the reaction is carried out in the presence of a nickel catalyst supported on an inert carrier.

9. The process in accordance with claim 3 characterized in that the reaction is carried out in the presence of a nickel catalyst supported on kieselguhr.

ROBERT B. FLINT.